Nov. 30, 1954 W. J. TAMMINGA 2,695,795
PIPE COUPLING AND GASKET RETAINER THEREFOR
Filed Jan. 16, 1952
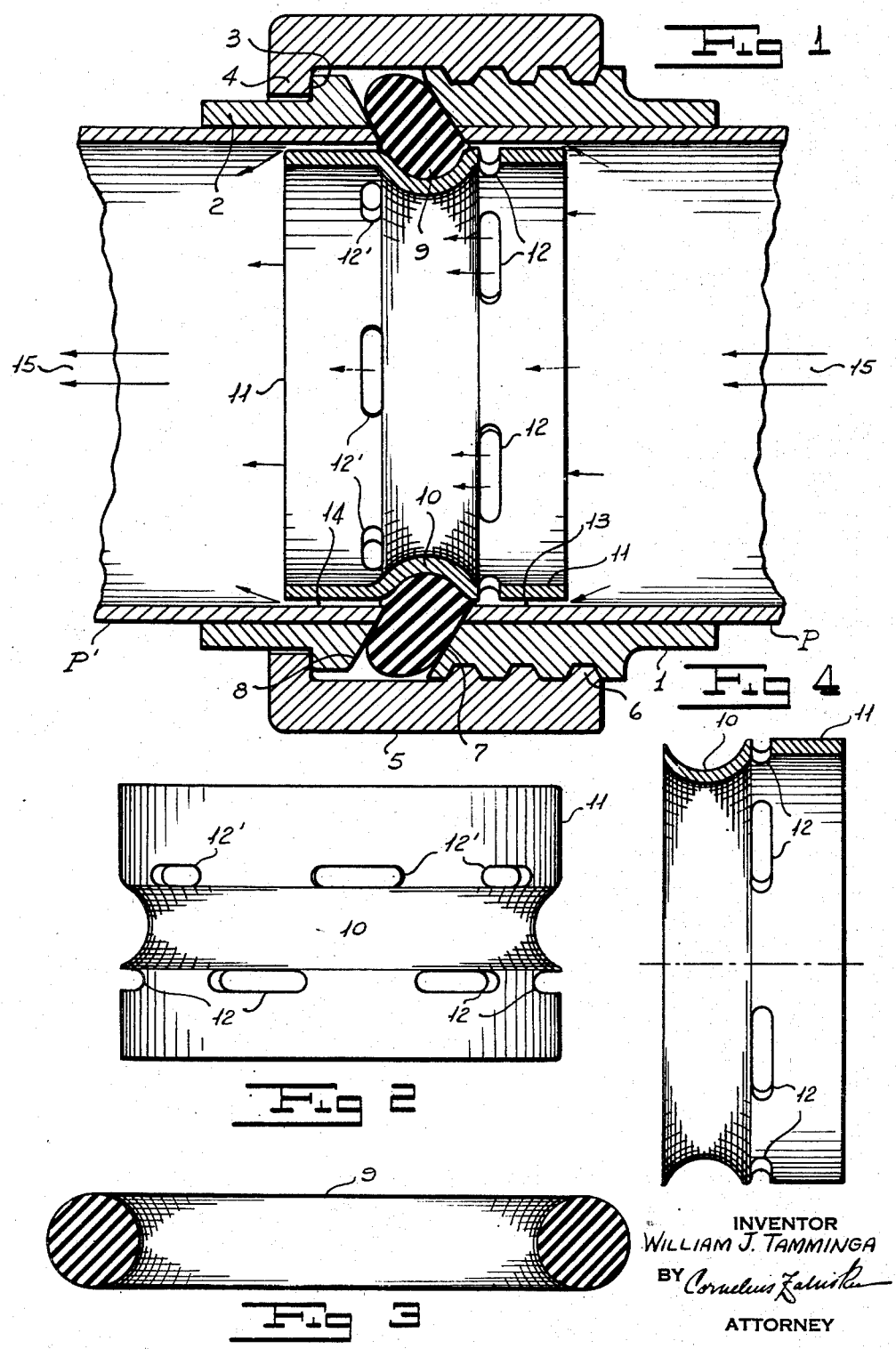
INVENTOR
WILLIAM J. TAMMINGA
BY Cornelius Zalwiske
ATTORNEY United States Patent Office 2,695,795
Patented Nov. 30, 1954

2,695,795

PIPE COUPLING AND GASKET RETAINER THEREFOR

William J. Tamminga, Goshen, N. Y., assignor to Wiz-Products, Inc., a corporation of New York Application January 16, 1952, Serial No. 266,720

2 Claims. (Cl. 285—120)

This invention relates to pipe couplings primarily intended for use in dairies where milk is processed and bottled. Various apparatus is employed in connection with these operations and such apparatus is connected by piping, which may be of stainless steel, dairy metal, or other similar material which is resistant to corrosion or attack by milk acids. The consecutive pipe sections are commonly connected to one another by pipe coupling soldered or brazed to the exterior of the pipe sections and threaded nuts serve to bind the sections together with interposed gaskets to preclude leakage.

It is of course essential in dairy installations that the piping as well as all other apparatus be maintained clean and sterile and to insure of this condition, it is the practice to dismantle the piping at frequent intervals, so that the parts thereof may be thoroughly cleaned and sterilized. During these operations the ends of the ferrules which are engaged by the gaskets frequently become damaged so as to make tight joints difficult of attainment. Furthermore, there is the ever present tendency of the lactic acid in the milk to attack the solder by which the ferrules of the couplings are secured to the pipe sections and this results in pitting and in due course destruction of the solder to a point where crevices may be present for the lodgment of bacteria and undesirable extraneous impurities.

One object of the invention is to provide simple and efficient means for insuring proper joints between contiguous ends of adjacent pipe sections and at the same time sealing the soldered joints between the pipe sections and the ferrules by the use of plastic gaskets, e. g., rubber gaskets, in such manner as to preclude the contact of milk with the solder and consequent protection of the solder against damage of the character described.

Another object of the invention is to insure proper cooperation between rubber gaskets and the pipe ends whereby the ever present tendency of the rubber gaskets to squeeze out, when too much pressure is applied, is avoided. This permits the pipe ends to be drawn very tightly together to effect a proper seal with the gaskets while the gaskets are positively secured against squeezing out of the impervious joint thus formed.

An important feature of this invention consists in the employment of a gasket retainer in the form of a sleeve, the outer diameter of which is less than the inner diameter of the pipe sections. This sleeve is adapted to be positioned at each joint in such relation thereto that it will bridge the space between the pipe ends and at this point in the length of the sleeve it is provided with an external circumferential channel adapted to receive the inner circumference of the rubber gasket interposed between said pipe ends. When this sleeve is thus positioned, the pipe ends may be drawn very tightly together, but no matter how tightly the gasket is compressed in this manner the sleeve will absolutely preclude it from being squeezed inwardly into the interior of the pipe while the coupling nut will preclude the gasket from squeezing in an outwardly radial direction. Consequently the gasket is confined in such manner that it cannot escape and a tight joint may thus be obtained.

When a gasket retaining sleeve is used in the manner described, there must be some clearance between the outer circumference of the sleeve and the inner circumference of the pipe sections and the clearance spaces which thus result constitute dead end pockets or cul-de-sacs in which milk flowing through the conduits may come to a quiescent state and tend to solidify and deteriorate and thereby constitute a source of contamination for milk flowing through the system.

As a result of experimentation and research, I have discovered that this pronounced drawback to a sleeve of the character described may be entirely overcome by providing the sleeve with openings directly adjacent its gasket channel. A number of these openings are arranged circumferentially of the sleeve and serve to permit the passage of milk therethrough, so as to set up a circulation through the clearance space between the sleeve and the pipe wall. As long as this circulation exists, cul-de-sacs are not formed and sanitary condition of the assembly is maintained. If the gasket channel is formed at some distance from each end of the sleeve, openings are provided at both sides of the channel and the openings of each side are preferably staggered with respect to the openings at the other side, so as not to unduly weaken the sleeve. These openings may be of any shape and size and may be of any number for the purposes stated.

Features of the invention, other than those adverted to, will be apparent from the hereinafter detailed description and claims, when read in conjunction with the accompanying drawing.

The accompanying drawing illustrates different practical embodiments of the invention, but the constructions therein shown are to be understood as illustrative, only, and not as defining the limits of the invention.

Figure 1 is a central section through a piping connection embodying the present invention.

Figure 2 is a side elevation of the gasket retaining sleeve shown in section in Figure 1.

Figure 3 is a central section through the gasket in uncompressed condition.

Figure 4 shows a modified form of gasket retaining sleeve.

In the drawing, P and P' designate the adjacent ends of two contiguous pipe sections. On the pipe section P is soldered a conventional threaded ferrule 1 and on the pipe section P' is soldered a conventional shouldered ferrule 2. The shoulder of the ferrule 2 is indicated at 3 and is adapted to cooperate with the inturned flange 4 of a nut 5. The inner circumference of the nut is threaded to screw on to complementary threads 6 on the exterior of the ferrule 1. The inner end of the ferrule 1 has a frusto conical sealing face 7, while the opposing end of the ferrule 2 has a complementary frusto conical sealing face 8. The gasket is designated 9 and is preferably of rubber. It may be any desired cross section, but is preferably of circular cross section and constitutes an O-ring. The ring 9 is adapted to be received within the circumferential channel 10 formed intermediate the ends of a tubular sleeve 11. This sleeve is adapted to fit loosely within the pipe sections P and P' and is preferably of such length as to extend into both pipe sections for a sufficient distance beyond the gasket to assist in aligning the pipe sections during their assembly.

As shown in Figures 1 and 2, the gasket channel 10 is positioned substantially midway of the length of the sleeve 11 and at either side of the channel and closely adjacent thereto are a series of openings. The openings at both sides of the channel may be the same size, shape or number, but they are preferably staggered as shown. For convenience in description, the holes at one side are designated 12, while those at the other side are designated 12' and they are elongated in a direction circumferentially of the sleeve, although they may be of a greater or lesser number and they may be elongated or otherwise as desired.

It will be noted in Figure 1 that when a sleeve is in place within the pipe ends, clearance spaces 13 and 14 occur at either side of the gasket and it is these clearance spaces that constitute the cul-de-sacs referred to. However, if it be assumed that the flow of milk through the system is in the direction of the double arrows 15 in Figure 1, this flow of milk will cause some milk to enter into the clearance space 13 at the right hand end of the sleeve and into the clearance space 14 at the other side of the gasket. However, any milk which enters the space 13 through the right hand end thereof, as indicated by some arrows, will exit through the openings 12, as indicated by other arrows, and thus set up a circulation which is active throughout the clearance space 13 and will preclude the lodging of any material therein in quiescent state. Similarly, the flow of milk, past the left hand end of the sleeve in Figure 1, will tend to set up an aspiratory action at this latter edge of the sleeve and thus set up a circulation through the openings 12' which will likewise keep the clearance space at that end portion of the sleeve free from undesirable quiescent accumulations.

When the structure which I have described is employed, it is possible to draw up the couplings very tightly in order to insure the most efficient fluid and air tight joints without any danger of squeezing out of the gaskets because they are entirely enclosed and may be deformed as much as necessary to obtain the joint tightness required. Furthermore, it will be noted that, when the gasket is compressed and deformed, as shown in Figure 1, it completely seals the joint between the ferrules 1 and 2 and the pipe sections P and P' and the solder used in the making of these joints is thus thoroughly isolated from contact with the milk and consequently safeguarded against deterioration due to pitting.

The sleeve shown in Figures 1 and 2 of the drawing extends for an appreciable distance beyond both sides of the channel 10. The channel is shown as formed closely adjacent one end of the sleeve in Figure 4. At this end, the proximity of the channel eliminates the cul-de-sacs which would otherwise be formed at this end, but the portion of the sleeve at the other side of the channel is provided with the openings 12 as in the preceding figures. In each embodiment of the invention, however, the channel is formed intermediate the ends of the sleeve with the circulation openings between at least one side of the channel and the corresponding end of the sleeve.

The foregoing detailed description sets forth the invention in its preferred practical forms, but the invention is to be understood as fully commensurate with the appended claims.

Having thus fully described the invention, what I claim as new and desire to secure by Letters Patent is:

1. A gasket retainer comprising: a tubular sleeve, the greater portion of the length of which is of cylindrical form and of a diameter to fit with clearance space into and conform to the interior of adjacent pipe ends in which the retainer is to be installed, said sleeve being provided intermediate its ends with an external circumferential channel shaped to conform to and adapted to receive a gasket of circular cross section, the wall of the sleeve being provided in its cylindrical portion and adjacent at least one side of the channel and at the base of the clearance space with a plurality of circulation openings.

2. A gasket retainer according to claim 1, wherein the circulation openings are spaced from the corresponding end of the sleeve to leave that end of the sleeve continuous and uninterrupted.

References Cited in the file of this patent

UNITED STATES PATENTS

| Number | Name | Date |
|---|---|---|
| 278,800 | Kline | June 5, 1883 |
| 469,830 | Cain | Mar. 1, 1892 |
| 934,983 | Schuermann | Sept. 21, 1909 |
| 918,858 | James | Apr. 20, 1909 |
| 2,032,297 | Mikulasek | Feb. 25, 1936 |
| 2,070,291 | McHugh | Feb. 9, 1937 |

FOREIGN PATENTS

| Number | Country | Date |
|---|---|---|
| 22,559 | Great Britain | Oct. 27, 1898 |
| 645,144 | France | Oct. 19, 1928 |
| 101,679 | Switzerland | Nov. 16, 1923 |